(12) United States Patent
Rice

(10) Patent No.: US 7,046,703 B2
(45) Date of Patent: May 16, 2006

(54) BESSEL FREE ELECTRON LASER DEVICE

(75) Inventor: Robert R. Rice, Simi Valley, CA (US)

(73) Assignee: The Boeing Company, Chicago, IL (US)

( * ) Notice: Subject to any disclaimer, the term of this patent is extended or adjusted under 35 U.S.C. 154(b) by 235 days.

(21) Appl. No.: 10/740,965

(22) Filed: Dec. 18, 2003

(65) Prior Publication Data

US 2005/0135437 A1      Jun. 23, 2005

(51) Int. Cl.
*H01S 3/00*      (2006.01)
(52) U.S. Cl. .......................................... 372/2
(58) Field of Classification Search .................. 372/2
See application file for complete search history.

(56) References Cited

U.S. PATENT DOCUMENTS

| | | | |
|---|---|---|---|
| 3,947,780 A | 3/1976 | Rice et al. | |
| 3,954,940 A | 5/1976 | Rice et al. | |
| 3,988,704 A | 10/1976 | Rice et al. | |
| 4,210,389 A | 7/1980 | Burkhart et al. | |
| 4,284,963 A | 8/1981 | Allen, Jr. et al. | |
| 4,428,601 A | 1/1984 | Rice et al. | |
| 4,439,014 A | 3/1984 | Stacy et al. | |
| 4,491,349 A | 1/1985 | Rice et al. | |
| 4,530,096 A * | 7/1985 | Bekefi et al. | 372/4 |
| 4,679,197 A * | 7/1987 | Hsu | 372/2 |
| 4,699,465 A | 10/1987 | Rice et al. | |
| 4,751,707 A | 6/1988 | Krebs et al. | |
| 4,903,341 A | 2/1990 | Rice | |
| 5,283,844 A | 2/1994 | Rice et al. | |
| 5,375,130 A * | 12/1994 | Shih | 372/2 |
| 5,495,490 A | 2/1996 | Rice et al. | |
| 5,677,923 A | 10/1997 | Rice et al. | |
| 5,694,408 A | 12/1997 | Bott et al. | |
| 5,715,270 A | 2/1998 | Zediker et al. | |
| 5,781,229 A | 7/1998 | Zediker et al. | |
| 5,807,764 A | 9/1998 | Rice et al. | |
| 5,832,006 A | 11/1998 | Rice et al. | |
| 5,841,802 A | 11/1998 | Whiteley et al. | |
| 5,847,816 A | 12/1998 | Zediker et al. | |
| 5,847,817 A | 12/1998 | Zediker et al. | |
| 5,867,257 A | 2/1999 | Rice et al. | |
| 5,946,130 A | 8/1999 | Rice | |

(Continued)

OTHER PUBLICATIONS

John Vetrovec, Andrea Koumvakalis, Rashmi Shah, Tom Endo, Development of Solid-State Disk Laser for High-Average Power, Lasers & Electro-Optics Systems, The Boeing Company, Canoga Park, CA, Jan. 26-31, 2003, p. 1-11.

(Continued)

*Primary Examiner*—Minsun Harvey
*Assistant Examiner*—Marcia A. Golub
(74) *Attorney, Agent, or Firm*—Ingrassia Fisher & Lorenz, P.C.

(57) ABSTRACT

Methods and apparatus are provided for modifying a free electron laser (FEL) to produce a non-diverging laser beam. A relativistic electron beam is converted to a Bessel beam in an FEL resonator with conical end mirrors, and the Bessel beam is coupled to the optical field within the laser resonator. The resultant laser beam is propagated with minimal divergence, and is wave corrected at the resonator output to produce a uniform intensity circular beam. The laser beam can be of smaller diameter than that of a conventional resonator due to its diffractionless propagation, which enables the magnetic structure gap within the resonator to be smaller, thus producing a higher optical gain.

5 Claims, 2 Drawing Sheets

U.S. PATENT DOCUMENTS

| | | |
|---|---|---|
| 6,061,170 A | 5/2000 | Rice et al. |
| 6,200,309 B1 | 3/2001 | Rice et al. |
| 6,339,605 B1 | 1/2002 | Vetrovec |
| 6,363,087 B1 | 3/2002 | Rice |
| 6,587,497 B1 | 7/2003 | Libby et al. |
| 6,598,478 B1 | 7/2003 | Rice |
| 6,600,946 B1 | 7/2003 | Rice |
| 6,625,354 B1 | 9/2003 | Hollister et al. |
| 6,651,799 B1 | 11/2003 | Rice et al. |
| 2002/0067750 A1 | 6/2002 | Rice et al. |
| 2002/0097769 A1 | 7/2002 | Vetrovec |
| 2002/0110164 A1 | 8/2002 | Vetrovec |
| 2002/0172253 A1 | 11/2002 | Vetrovec |
| 2003/0012237 A1 | 1/2003 | Tuganov et al. |
| 2003/0019757 A1 | 1/2003 | Vetrovec |
| 2003/0042404 A1 | 3/2003 | Rice et al. |
| 2003/0086466 A1 | 5/2003 | Cox et al. |
| 2003/0089174 A1 | 5/2003 | Rice |
| 2003/0197860 A1 | 10/2003 | Rice |
| 2003/0198264 A1 | 10/2003 | Vetrovec et al. |
| 2003/0227948 A1 | 12/2003 | Rice |

OTHER PUBLICATIONS

John Vetrovec, Andrea Koumvakalis, Rashmi Shah, Solid-State Disk Laser for High-Average Power, Lasers & Electro-Optics Systems, The Boeing company, Canoga Park, CA, Aug. 26-30, 2002, p. 1-4.

John Vetrovec, Ultrahigh-Average Power Solid-State Laser, The Boeing Company, Canoga Park, CA Apr. 22-26, 2002, p. p. 1-15.

John Vetrovec, Compact Active Mirror Laser (CAMIL), The Boeing Company, Canoga Park, CA Jan. 22-26, 2001, p. 1-12.

Lens Problems Scupper 157nm. Optics.org [online]—Retrieved from Internet Oct. 2, 2003: <URL: www.optics.org/articles/ole/8/9/5/1>.

C.L. Tsangaris, and J. Rogel-Salazar, Unstable Bessel Bean Resonator, Quantum Optics and Laser Science Group, Department of Physics, London, UK, Jun. 22, 2003, p. 233-238.

* cited by examiner

BESSEL FREE ELECTRON LASER DEVICE

TECHNICAL FIELD

The present invention generally relates to a Free Electron Laser (FEL), and more particularly relates to a Bessel beam FEL.

BACKGROUND

A Free Electron Laser (FEL) is a form of laser device invented by J. M. J. Madey in 1971. The FEL is a laser device in which the optical gain is provided by the motion of free electrons, as opposed to electrons that are bound to lasant ions, or are moving about in a semiconductor. In a typical FEL device, a laser beam propagates coaxially with a relativistic electron beam, or e-beam, in a resonator. The e-beam is generally a very high-energy beam, which is usually produced by an accelerator. The e-beam typically passes through a transverse periodic magnetic field produced by a regularly spaced array of magnets of alternating polarity. The magnet structure, known as an "undulator" or "wiggler magnet", is designed to cause the e-beam to exchange energy with the transverse magnetic field. This energy interchange tends to generate a transverse oscillation in the e-beam at the same frequency as that of the laser beam, thereby amplifying the laser beam, and providing optical gain.

The FEL has characteristics that are particularly useful in certain types of laser applications. A typical FEL generates a very high quality output beam, and can be operated at very high power levels, as compared to most other types of lasers. The FEL can also be operated at virtually any wavelength, in contrast to other laser technologies. It is therefore a very flexible source of coherent radiation, and is an attractive device for Directed Energy and ladar applications.

As FEL devices are scaled up in power, however, the resonator end mirrors are typically subjected to very high power densities. In addition, matching the e-beam and laser resonator beam for highly efficient conversion can be a difficult process. To achieve strong beam interaction, and thereby high optical gain, it is generally desirable to confine both the e-beam and the laser beam as tightly as possible within the wiggler magnet gap. The use of a small diameter laser beam, however, typically leads to an undesirable amount of beam divergence over the long electron beam interaction path generally needed for efficient amplification of the optical beam, with a corresponding reduction in optical gain. Moreover, the use of a small diameter optical beam in an FEL generally results in very high power densities on the resonator mirrors that would typically limit the power capabilities of an FEL resonator with conventional mirrors. To mitigate this power limitation, so-called "grazing incidence" resonator mirrors have been developed, which are designed to spread the power density over a relatively large surface area. However, the grazing incidence type of mirror design is generally very costly, due to the complexity of the mirror fabrication. As such, it is desirable to configure a type of FEL laser with minimal divergence of the laser beam along its interaction path with the e-beam within the FEL resonator, and also to reduce the optical power density impinging on the resonator end mirrors.

Accordingly, it is desirable to provide an FEL configuration that enhances the interaction of laser beam and e-beam by confining the e-beam and the optical field as tightly as possible within a wiggler magnet gap. In addition, it is desirable to reduce the optical power density on the resonator end mirrors of an FEL, to avoid the added cost and complexity of using a grazing incidence or other special type of mirror structure. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, devices and methods are provided for propagating a laser beam with minimal divergence in a free electron laser (FEL). One exemplary method includes the steps of generating a relativistic electron beam, modifying the relativistic electron beam into a Bessel beam, and coupling the Bessel beam to the FEL optical field to produce a non-diverging laser beam. The non-diverging laser beam output can be shaped into a different beam pattern, such as a uniform intensity circular beam, for reducing peak power levels.

One exemplary device for propagating a non-diverging laser beam in an FEL includes an accelerator configured to generate a relativistic electron beam (e-beam) into a modified laser resonator. The laser resonator has conical mirrors at each end, with the conical mirrors facing each other. The mirrors each have beam apertures in their centers, with one mirror aperture configured to receive the e-beam from the accelerator, and the other mirror aperture configured to output the non-diverging laser beam. An array of magnets of alternating polarity, configured within the laser resonator, generate a transverse magnetic field. The interaction of the e-beam with the transverse magnetic field and with the conical end mirrors produces a Bessel beam, which is tightly coupled to the optical field within the laser resonator to produce a non-diverging laser beam output. The non-divergence characteristic of the beam in the resonator enables the use of a small gap in the magnet structure, which enhances the optical gain of the system. A wave front corrector can be positioned at the output of the laser resonator to shape the non-diverging laser beam into a uniform intensity circular beam to reduce peak power levels.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of enhancing the power output capabilities of an FEL type device. One exemplary embodiment provides a modified laser resonator that shapes an e-beam into a Bessel beam configuration. The Bessel beam is coupled with the optical field in the resonator to produce a non-diverging laser beam, which allows for a smaller wiggler magnet gap and the associated higher optical gain. The use of a smaller laser beam diameter can also lead to a more rapid beam divergence at the end of the Bessel range, which enables the use of larger end mirrors to reduce the power density of the impinging beam.

Figure 1:
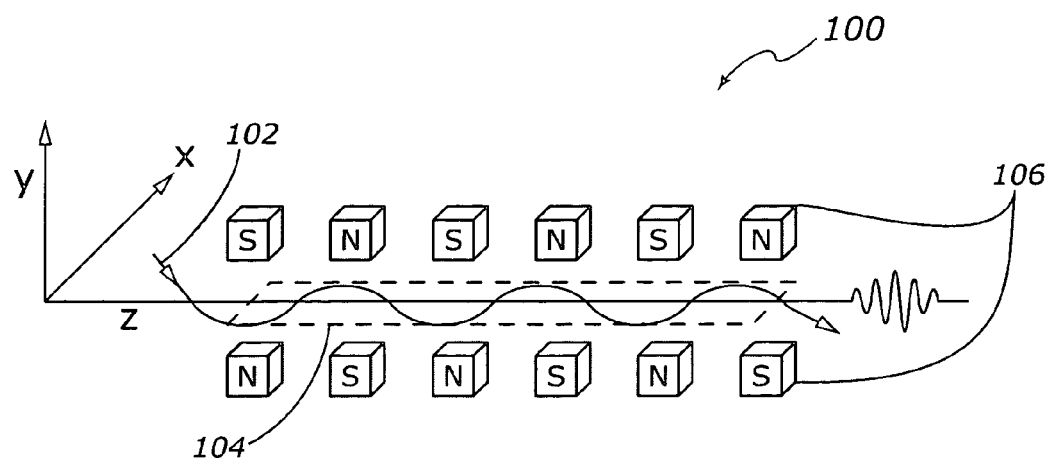
FIG. 1 is a simplified operational diagram of an exemplary FEL.

The basic operation of a conventional FEL 100 is illustrated in simplified form in FIG. 1. A beam 102 of relativistic electrons (e-beam) is passed through a transverse magnetic field 104 generated by an undulator, or wiggle, magnet structure 106 in a laser resonator (not shown). The energy exchange between the e-beam 102 and the electromagnetic field 104 tends to accelerate some electrons in the e-beam, while decelerating others. The resultant bunching effect of the electrons in the resonator can produce very powerful coherent radiation at a wavelength dependent on the electron energy of e-beam 102 and the magnitude and periodicity of the electromagnetic field 104.

As noted previously in the Background section, the power capabilities of a conventional FEL can be limited by laser beam divergence and/or the high level of power density impinging on the end mirrors of a laser resonator. For example, a diverging laser beam can make it difficult to achieve the desired matching of e-beam and laser beam diameters, typically causing a decrease in the optical gain along the propagation path. Moreover, a diverging laser beam generally requires a larger wiggler magnet gap separation, which can also diminish the optical gain of the system.

Figure 2:
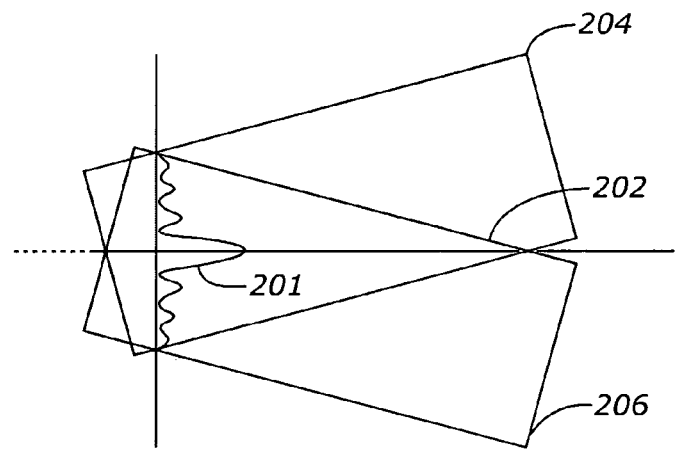
FIG. 2 is a diagrammatic representation of an exemplary Bessel Beam.

There is a type of laser beam known as a Bessel beam, which has an advantageous characteristic described as "diffractionless". That is, the Bessel beam does not spread laterally with propagation distance, as typically occurs with conventional laser beams. A Bessel beam may be described as the superposition of an infinite set of plane waves whose vectors lie on the surface of a cone. Alternately, a Bessel beam can be considered as a transverse standing wave formed in the interference region between incoming and outgoing conical waves, as depicted in the diagram of FIG. 2. In this intuitive illustration, a transverse standing wave 201 is depicted as being formed in the interference region, or cone of superposition 202, from conical waves 204 and 206.

Figure 3:
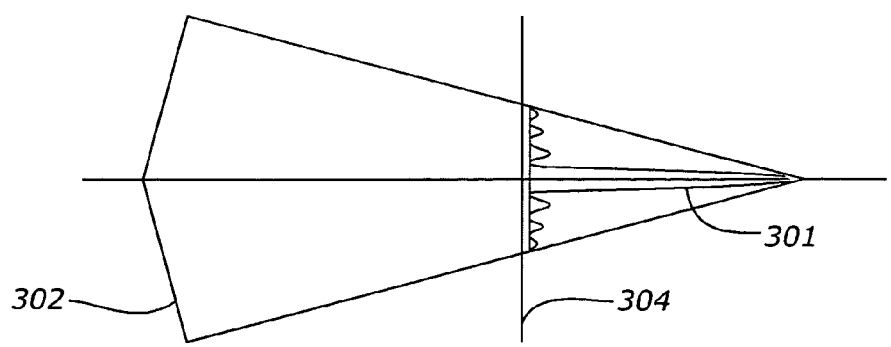
FIG. 3 is a diagrammatic representation of an exemplary Bessel Beam resonator.
Figure 4:
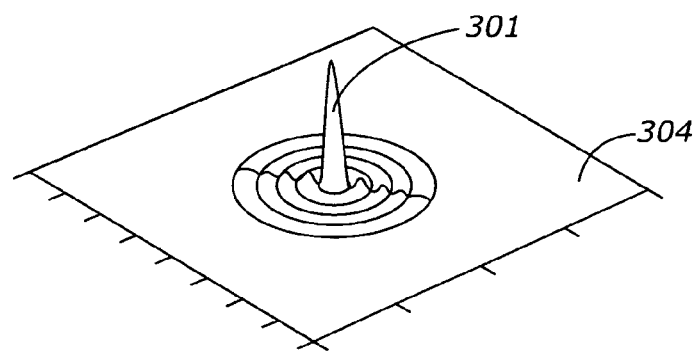
FIG. 4 is a perspective drawing of a Bessel Beam formation.

It is known that a Bessel beam can be generated from a conventional laser beam with appropriate optical elements. Since the constituent waveforms of a Bessel beam are considered to be conical, it generally follows that a conical end mirror can support a Bessel beam mode. One known configuration, for example, is illustrated in FIG. 3, where the Bessel beam 301 is formed in a Bessel resonator having a conical mirror, or axicon, 302 and a plane (flat) mirror 304. A perspective view of Bessel beam 301 is shown in FIG. 4 at the flat end mirror 304.

Figure 5:
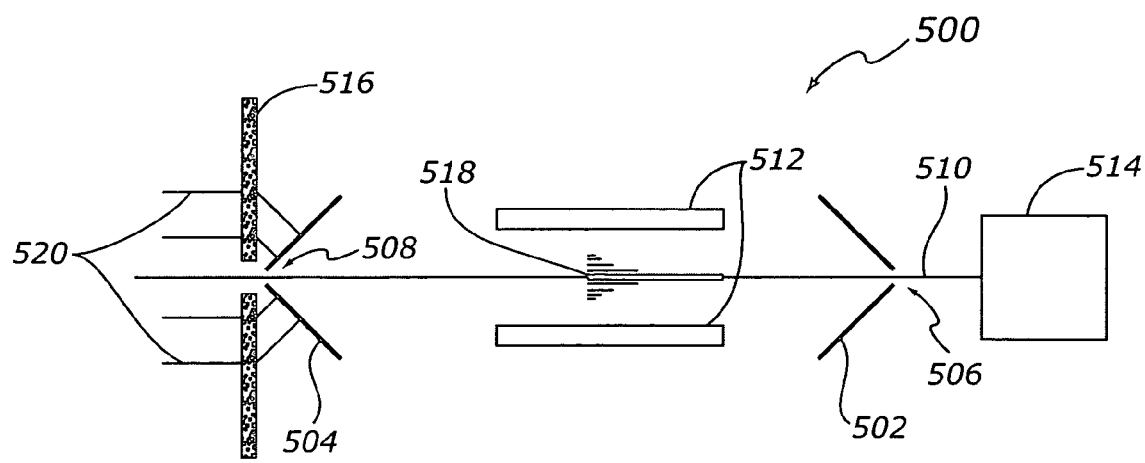
FIG. 5 is a block diagram of an exemplary embodiment of a Bessel resonator FEL device.

According to an exemplary embodiment of an FEL with Bessel beam enhanced power capabilities, a relativistic electron beam (e-beam) can be introduced into a modified Bessel beam resonator along its axis, such that the extent of the optical field in the resonator is closely matched to that of the e-beam. In this exemplary embodiment, designated herein as a Bessel FEL device 500 in FIG. 5, two conical mirrors 502, 504 are disposed facing each other, at opposite ends of a Bessel resonator configuration. Mirrors 502, 504 can have apertures 506, 508 for an e-beam 510, as depicted in FIG. 5, or, in an alternative embodiment, e-beam 510 can be magnetically folded into and out of the resonator. A wiggler magnet structure 512 is shown above and below the beam path, as is typical for an FEL device. A relativistic electron beam accelerator 514 is typically used to generate the e-beam 510. A wave corrector plate 516 can be provided at the output of conical mirror 504 for beam shaping purposes. Plate 516 can be in the form of an axicon lens, or it can be any appropriate type of diffractive optical element.

In the exemplary embodiment shown in FIG. 5, accelerator 514 may be in the form of a superconducting linear accelerator of conventional design producing an e-beam 510 in the megavolt range at current levels on the order of an ampere or greater. E-beam 510 is then suitably coupled into Bessel FEL device 500 via aperture 506 in conical end mirror 502. E-beam 510 interacts with a transverse magnetic field produced by wiggler magnet structure 512 within the resonator cavity, and with conical end mirrors 502, 504, to generate an intracavity Bessel beam 518, as depicted in FIG. 5. Wave corrector plate 516 is used in this embodiment to shape Bessel beam 518 as it passes through aperture 508 in conical end mirror 504. Typically, the wave corrected output laser beam 520 will be configured as a uniform intensity circular beam with a small hole in its center. This type of uniform intensity beam shape is generally advantageous for high-energy applications, because the peak intensity level imposed on the optical elements can be reduced for a given level of average power.

Accordingly, the shortcomings of the prior art have been overcome by providing an improved FEL power handling capability. One exemplary embodiment combines the non-diverging characteristic of a Bessel beam with an FEL beam in a modified laser resonator. The resultant non-diverging laser beam can be propagated with a smaller diameter in the resonator cavity, thus allowing for a smaller wiggler magnet structure gap. The smaller wiggler gap can result in an improved interaction between the intracavity Bessel beam and the transverse magnetic field in the gap, thus enabling an increase in the optical gain of the system. The smaller beam diameter can also lead to an increase in beam divergence at the end of the Bessel range, thus enabling the use of larger end mirrors to better distribute power density. Moreover, wave-shaping optics can form the output laser beam into a uniform intensity beam, which can also mitigate the peak power impinged on the system optics. As such, the exemplary embodiment disclosed herein can achieve the previously stated objectives of enhancing laser beam power capabilities and reducing the power density levels imposed on the laser optical system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of propagating a laser beam in a free electron laser (FEL) having an FEL optical field, comprising the steps of:
generating a relativistic electron beam;
modifying the relativistic electron beam into a Bessel Beam; and
coupling the Bessel Beam to the FEL optical field to produce a non-diverging laser beam that is shaped into a uniform intensity circular beam.

2. An apparatus for propagating a laser beam in a free electron laser (FEL), comprising:
an accelerator configured to generate a relativistic electron beam;
a laser resonator having conical mirrors at each end, with the conical mirrors facing each other; and
an array of magnets of alternating polarity configured within the laser resonator, wherein the relativistic electron beam is converted to a Bessel beam within the laser resonator, and wherein the Bessel beam is coupled to an optical field within the laser resonator to produce a non-diverging laser beam output.

3. The apparatus of claim 2 wherein a wave front corrector is positioned at the output of the laser resonator to adjust the non-diverging laser beam into a uniform intensity circular beam.

4. The apparatus of claim 2 wherein the conical mirrors are configured as axicons with centered beam apertures.

5. A Bessel FEL device, comprising:
a laser resonator having conical mirrors at each end, with the conical mirrors facing each other; and
an array of magnets of alternating polarity configured within the laser resonator, wherein a relativistic electron beam is converted to a Bessel beam within the laser resonator, and wherein the Bessel beam is coupled to an optical field within the laser resonator to produce a non-diverging laser beam output.

* * * * *